United States Patent [19]

Hansson

[11] Patent Number: 5,014,794
[45] Date of Patent: May 14, 1991

[54] POWER DRIVEN TOOL AND DRIVE SYSTEM THEREFOR

[75] Inventor: Gunnar C. Hansson, Stockholm, Sweden

[73] Assignee: Atlas Copco AB, Stockholm, Sweden

[21] Appl. No.: 376,499

[22] Filed: Jul. 7, 1989

[30] Foreign Application Priority Data

Jul. 8, 1988 [SE] Sweden .............................. 8802566

[51] Int. Cl.$^5$ ........................................ B25B 23/151
[52] U.S. Cl. ........................................ 173/12; 173/2; 81/469; 29/407
[58] Field of Search ............................ 173/2, 4, 11, 12; 81/467, 469; 83/74; 408/11; 29/407

[56] References Cited

U.S. PATENT DOCUMENTS

| | | | |
|---|---|---|---|
| 3,965,778 | 6/1976 | Aspers et al. | 81/469 |
| 4,375,121 | 3/1983 | Sigmund | 173/12 |
| 4,653,358 | 3/1987 | Lankry | 81/469 |
| 4,813,312 | 3/1989 | Wilhelm | 81/469 |
| 4,858,312 | 8/1989 | Van Naarden | 81/469 |

Primary Examiner—Frank T. Yost
Assistant Examiner—Scott A. Smith
Attorney, Agent, or Firm—Sughrue, Mion, Zinn, Macpeak and Seas

[57] ABSTRACT

A portable screw fastener driving tool is driven electrically from a solid state inverter and intended to be coupled to any selected one in a set of screw fastener engaging members, each demanding a drive enabling tightening of the engaged fastener by parameters (e.g. torque, angle, speed) specific to its size or type. Code elements are provided on the members in a binary code pattern specific for each member. Sensors on the tool read the code pattern on the member connected to the tool and serve it electrically to a decoding unit which transforms the read binary pattern to signals adapted to control the inverter the way the member demands.

10 Claims, 2 Drawing Sheets

POWER DRIVEN TOOL AND DRIVE SYSTEM THEREFOR

BACKGROUND OF THE INVENTION

This invention relates to a hand held power driven tool and a drive system therefor for tightening threaded fasteners. The tool comprises a portable housing with an electric motor therein connected to drive an output shaft to which any selective one in a set of fastener engaging members is releasably connectable into working position.

Tools of that type have been introduced in the automotive industry for performing continuous repetitive work on assembly lines and include an electronic drive unit of solid state inverter type for each tool adapted to transform a single phase AC power input into three phase AC current to the motor. The frequency and tension of the current are automatically and continuously varied and controlled by the drive unit closely according to the demand of the tightening process performed by the fastener engaging member of the tool. In hitherto used applications, due to the automatic character of the operation the tool and drive unit have been set to tighten just one size or type of fasteners at a time, which means that on for instance an assembly line for engines or car bodies, the operator has been able to tighten fasteners in just a few positions on each object. This means that the operator is restricted to an undesirably monotonous work.

It is an object of the invention to enable use of the tool and drive unit on a whole set of fasteners of different sizes by enabling the drive unit to automatically adapt the parameters of the served electric power to the needs of the actual fastener.

This object is attained by the invention defined in the following claims and hereinafter described with reference to embodiments thereof illustrated in the accompanying drawings.

DETAILED DESCRIPTION OF THE PREFERRED EMBODIMENT

Figure 1:
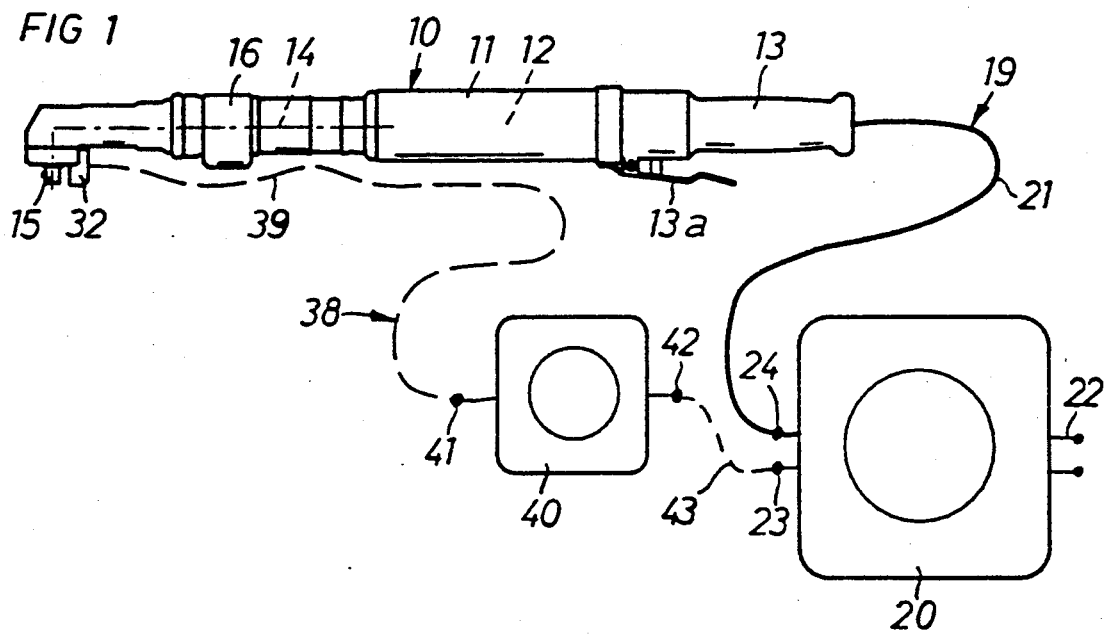
FIG. 1 is a simplified illustration of one embodiment of the invention.

FIG. 1 illustrates a power driven hand tool 10 such as an angle nut runner with a housing 11 incorporating a brushless three phase AC motor 12, not illustrated in detail, a handle 13 associated with an actuator 13a, and a conventional power transmission illustrated by the dash and dot line 14 terminated by an output shaft 15. Planetary gearing and clutch means in the power transmission 14 are indicated at 16.

The tool 10 is coupled to an electronic drive unit 20 by a first circuit 19, comprising a three phase cable 21 while the drive unit 20 is provided with a single phase input 22. The drive unit 20 is a solid state inverter of commercially available type, such as for example retailed by Atlas Copco AB, Sweden, under the trade name Tensor, these inverters are provided with a control input 23 and a three phase output 24 to which the cable 21 is coupled. By applying a given control signal to the input 23 of the inverter 20 it is possible either to change the inverter frequency on the output 24, to reverse the direction of rotation of the motor 12 or to change the value of a given maximum current so as to change the maximum torque of the motor 12.

Figure 2:
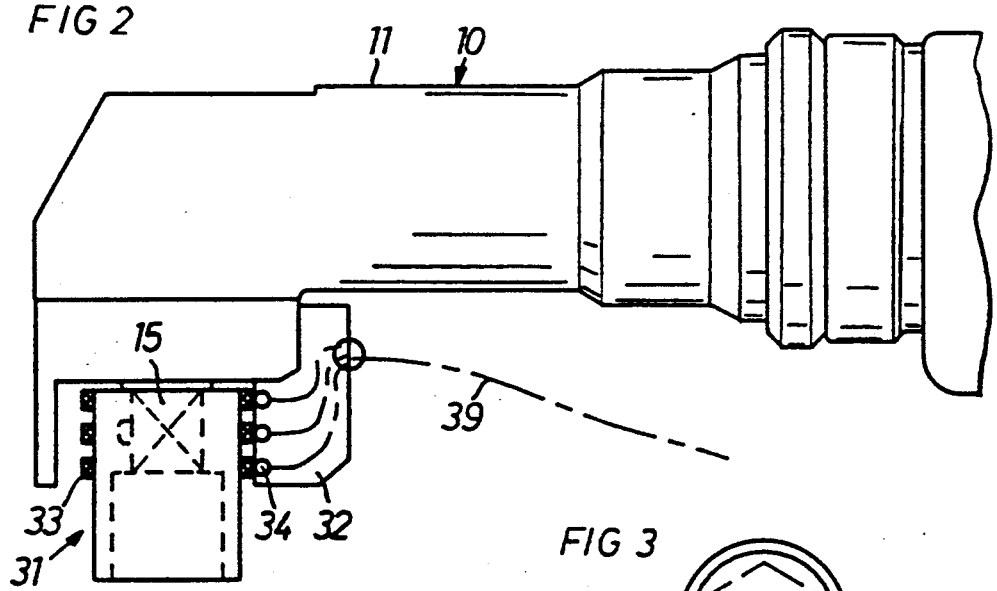
FIG. 2 is an enlarged side view of the front end of the tool shown in FIG. 1.
Figure 3:
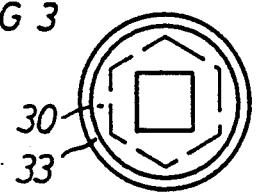
FIG. 3 is a top view of the fastener engaging member shown in FIG. 2.

In FIG. 2 a fastener engaging member such as a screw or nut socket 30 has been releasably slipped on the square end of the output shaft 15 to occupy working position, indicated by the arrow 31. The socket 30 cooperates with fasteners, in this case nuts, of a certain dimension demanding specific values of the drive parameters such as torque, drive angle and speed for the tightening of the fastener. These drive parameters are set on the inverter 20, supplying the tool motor 12. In order to enable a proper function, i.e. to control the inverter 20 such that, for example, a given current is fed to the motor 12 to obtain a predetermined torque, the socket 30 is provided with an identification code. This code is in the embodiment shown represented by a binary code constituted by the presence or absence of magnetized rings 33, axially spaced along the socket 30. The code should contain at least two binary digits and preferably at least three digits. The socket 30 of FIG. 1 is provided with three magnetized rings 30 in three possible digit positions.

A bracket 32 is provided adjacent to the working position of the socket 30 and carries a number of sensors 34, in this case three sensors each cooperating with a digit or code position. The sensors are in 34 in alignment with the three code elements 33 on the socket 30. In the embodiment shown, the sensors 34 are of the conventional Hall effect type, and each of them senses the presence or absence of a magnetized ring 33 in the corresponding position. These sensors form part of a second circuit 38. In the present case each sensor cooperates with a ring 33 and is, thus, influenced by the magnetic field of the corresponding ring 33 so as to generate an output signal, i.e. the binary digits 111, characterizing the socket 30 shown on FIG. 2.

The binary signal is transferred through a cable 39 to the input terminal 41 of a decoding or signal reading unit 40. The output terminal 42 of the decoding unit is connected by a cable 43 to the control input 23 of the inverter 20.

The inverter 20 is reset to generate a three-phase output corresponding to the control signal received from the decoding unit 40 and which control signal corresponds to the binary digit signal generated by the sensors 34. As a result the inverter 20 is set to supply the motor 12 with electric energy having the characteristics required by the socket 30 used, a constant maximum current or a specific voltage frequency for example.

Preferably the inverter 20 or the decoding unit 40 is provided with a data program unit of any well known type which receives the identification or control signal from the decoding unit 40 respectively directly from the sensors, the arrangement being such that the identification signal selects a program specific for the socket and which program controls the inverter 20 to obtain the function requested, say a variable output frequency or a variable current from the inverter 20.

Figure 4:
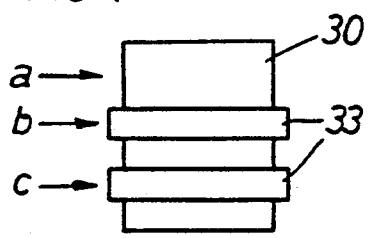
FIG. 4 is a side view of a second fastener engaging member forming part of the set of members to be used by the tool.

FIG. 4 schematically shows a socket 30, which, like the socket of FIG. 1, has three code positions a,b,c. In this case only two magnetic rings 33 are provided and therefore the binary digits 011 will be generated by the three sensors 34.

Figure 5:
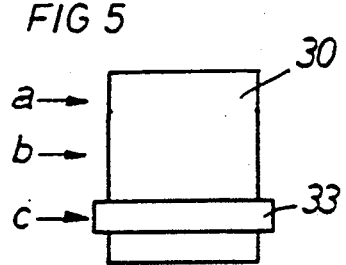
FIG. 5 is a third member in the set for the tool.

FIG. 5 discloses a socket 30, identified by a single ring 33 in position c and the sensors will accordingly generate the characteristic binary signal 001.

Figure 6:
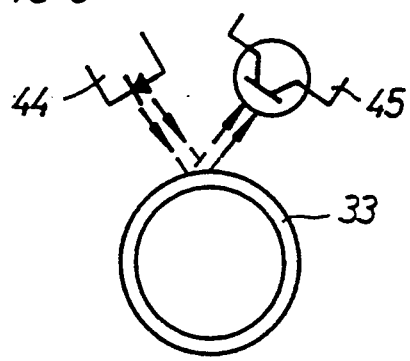
FIG. 6 illustrates in top view a fastener engaging member subject to a modified code sensing.

FIG. 6 discloses a wrench provided with dark or light areas in the code positions, not shown but arranged axially of the socket in the positions shown in FIGS. 4 and 5. Each of these areas are sensed by a light beam, generated by a light emitting diode 44, for example, and the light beam is reflected by the wrench surface onto a sensor 45, a photo transistor, for example.

Figure 7:
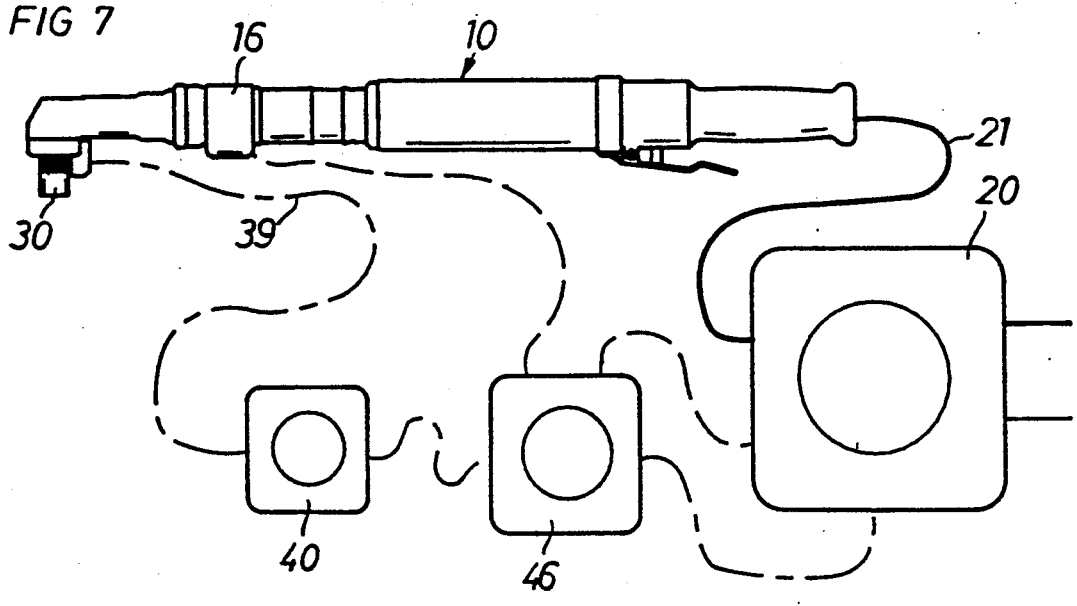
FIG. 7 is a simplified illustration of a modified form of the embodiment in FIG. 1.

FIG. 7 schematically discloses a power driven hand tool of the same type as described above but provided with a torque and/or angle sensor arranged in the power transmission 16 to indicate the momentary torque and/or angle of rotation of the socket. The output signal transmitted by the angle sensor is received by an electronic program unit 46 as is the code signal from the socket sensors. The program unit is arranged to control the inverter 20 as already described and to break the current from the inverter when the output torque has reached a predetermined value and/or when the fastener has been rotated a predetermined angle.

It is obvious to those skilled in the art that the sensing system of the socket or other tool, a screw driver bit, for example, attached to the hand tool can be modified and the elements described be substituted by other elements known in the art.

I claim:

1. A power driven tool and drive system for tightening screw fasteners comprising: a portable housing; a rotary motor in said housing responsive to specific electrical input power having at least one particular drive parameter with a predetermined variation during tightening; a static converter means having an output and a control input, said converter means being connected to said motor so as to selectively provide from said output said specific electrical power having said at least one drive parameter; a first circuit means connecting said motor to said output of said static converter means; an output shaft on said housing in driven connection with said motor thereof; at least two screw fastener engaging members selectively connectable to said output shaft into working position on said housing to be driven by said motor and each demanding to receive from said static converter and motor, via code elements its own specific driving parameter and predetermined variation thereof for proper tightening of a screw fastener engaged by said member in its working position; a second circuit means connecting said housing to said control input of said converter means, said second circuit having a special identification means on said housing for identifying said members via said code elements: and said identification means being connected to electronic means in said second circuit to set said control input on said converter means so that said converter means is adjusted to generate the specific electrical power for said motor demanded by the member connected to said output shaft.

2. A power tool and drive system according to claim 1, wherein said special identification means comprises at least two binary sensors in said second circuit disposed on said tool adjacent to the working position of said members; said code elements located on each member in a binary code pattern separate for each said member, said elements being readable by said sensors in the working position of said members so as to feed said second circuit with the specific code pattern of the member occupying working position; and said electronic means in said second circuit comprising a binary decoding unit for transforming said code pattern to electrical signals for the desired setting of said control input of said converter.

3. A power tool and drive system according to claim 2, wherein said members comprise cylindrical sockets removably slippable onto said output shaft; said code elements being a sequence of axially spaced magnetized rings on and around said members, the presence and absence of a ring in said sequence providing said binary code pattern; and said sensors being responsive to magnetism.

4. A power tool and drive system according to claim 2, wherein said members comprise cylindrical sockets slippable onto said output shaft, said code elements being a sequence of axially spaced light reflecting areas on said members, the presence and absence of a reflecting area in said sequence providing said binary code pattern, and said binary sensors on said tool including light emitting means and photoelectric sensors in the reflectory path of the light from said emitting means.

5. A power tool and drive system according to claim 2, wherein a tightening parameter analyzing unit is provided in said second circuit, said binary decoding unit being connected to feed first electrical signals to said analyzing unit, tightening parameter transducing and encoding means in said tool are connected to feed second electrical signals to said analyzing unit, and said analyzing unit being adapted to transform said first and second signals to electrical command signals to said control input so as to change the power output from said converter means according to the drive parameter variation desired for the motor.

6. A power driven screw fastener tightening tool comprising: a portable housing; a rotary motor in said housing responsive to specific electrical input power having at least one particular drive parameter with a predetermined variation during tightening; a first circuit means connectable to said motor and to electrical power means of static converter type to selectively provide said motor with said specific electrical power having said at least one drive parameter; an output shaft on said tool housing in driven connection with said motor connected to any one of a set of screw fastener engaging members placed selectively into working position on said output shaft to be driven thereby and each demanding, when in such position to receive from said motors, its own specific driving parameter and predetermined variation thereof, via code elements, for proper tightening of a screw fastener engaged by said member; a second circuit means connectable to said tool and to said power means, said second circuit means including a special identification means on said tool for identifying said members adjacent to said working position thereof via said code element; and electronic means in said second circuit connected to said identification means and to said power means to set said power means to generate the specific electrical power for said motor demanded by the member connected in working position on said output shaft.

7. A power driven screw fastener tightening tool according to claim 6, wherein said special identification means comprises a plurality of binary sensors in said second circuit disposed on said tool adjacent to the working position of said members for reading a binary code pattern provided on each said member in correspondence to its specific demand of driving parameter variation; and said electronic means comprising a binary decoding unit for transforming the code pattern read by said sensors to electrical signals for the desired setting of said power means.

8. A power driven screw fastener tightened tool according to claim 7, wherein said code elements are provided outwardly on said member in a binary code pattern specific for said member; said member is releasably slippable into working position on said tool; and said code elements being readable by said sensors of said tool with said member in working position.

9. A power driven screw fastener tightening tool according to claim 8, wherein said code elements are a sequence of axially spaced magnetized rings on and around said members, the presence and absence of a ring in said sequence providing said binary code pattern.

10. A power driven screw fastener tightening tool according to claim 8, wherein said code elements are a sequence of axially spaced light reflecting areas on said members, the presence and absence of a reflecting area in said sequence providing said binary code pattern.

* * * * *